(12) United States Patent
Kiefer et al.

(10) Patent No.: US 12,325,092 B2
(45) Date of Patent: Jun. 10, 2025

(54) METHOD AND DEVICE FOR DETERMINING AN ACTUAL STATE OF SUPPORTING BARS OF A WORKPIECE SUPPORT, AND MACHINE TOOL HAVING A DEVICE OF THIS TYPE

(71) Applicant: TRUMPF Werkzeugmaschinen SE + Co. KG, Ditzingen (DE)

(72) Inventors: Manuel Kiefer, Sinsheim (DE); Jens Ottnad, Karlsruhe (DE); Willi Poenitz, Leonberg (DE); Frederick Struckmeier, Heimsheim (DE); Marc Teschner, Stuttgart (DE)

(73) Assignee: TRUMPF WERKZEUGMASCHINEN SE + CO. KG, Ditzingen (DE)

( * ) Notice: Subject to any disclaimer, the term of this patent is extended or adjusted under 35 U.S.C. 154(b) by 227 days.

(21) Appl. No.: 17/944,203

(22) Filed: Sep. 14, 2022

(65) Prior Publication Data

US 2023/0001522 A1 Jan. 5, 2023

Related U.S. Application Data

(63) Continuation of application No. PCT/EP2021/056805, filed on Mar. 17, 2021.

(30) Foreign Application Priority Data

Mar. 17, 2020 (DE) .................. 10 2020 107 256.2

(51) Int. Cl.
*B23K 37/04* (2006.01)
*B23K 26/38* (2014.01)
*G01B 11/25* (2006.01)

(52) U.S. Cl.
CPC .......... *B23K 37/0408* (2013.01); *B23K 26/38* (2013.01); *G01B 11/2518* (2013.01)

(58) Field of Classification Search
CPC ...... G01B 11/24; G01B 11/25; G01B 11/2518
See application file for complete search history.

(56) References Cited

U.S. PATENT DOCUMENTS

| 4,349,182 A | 9/1982 | Blackburn |
| 4,807,991 A | 2/1989 | Carew et al. |

(Continued)

FOREIGN PATENT DOCUMENTS

| CN | 101448606 A | 6/2009 |
| CN | 106064209 A | 11/2016 |

(Continued)

*Primary Examiner* — Mary Ellen Bowman
*Assistant Examiner* — Justin J Van Cleave
(74) *Attorney, Agent, or Firm* — LEYDIG, VOIT & MAYER, LTD.

(57) ABSTRACT

A method determines an actual state of a supporting bar for supporting a plate-like workpiece on a machine tool for a cutting the workpiece. The method includes: determining a geometry of supporting projections on the supporting bar by a light section method, which includes: projecting a longitudinal line of light onto a longitudinal side of the supporting bar; with the line of light, scanning the longitudinal side over a height region assigned to the supporting projections in the direction of the height of the supporting bar, detecting the scanned extent of the longitudinal side of the supporting bar to generate an image of the longitudinal side of the supporting bar, and determining the geometry of the supporting projections based on the generated image; and comparing the determined geometry of the supporting projections with the defined intended geometry of the supporting projections.

18 Claims, 2 Drawing Sheets

(56) References Cited

U.S. PATENT DOCUMENTS

| | | |
|---|---|---|
| 5,304,773 A | 4/1994 | Kilian et al. |
| 5,698,120 A | 12/1997 | Kurosawa et al. |
| 10,151,583 B2 | 12/2018 | Lacaze et al. |
| 10,207,308 B2 | 2/2019 | Kowal |
| 2009/0184097 A1 | 7/2009 | Klaiber et al. |
| 2016/0187867 A1 | 6/2016 | Hasty et al. |
| 2016/0313114 A1* | 10/2016 | Tohme ................ H04N 13/257 |
| 2020/0149880 A1* | 5/2020 | Nishiki .............. G01B 11/2518 |

FOREIGN PATENT DOCUMENTS

| | | | |
|---|---|---|---|
| CN | 107111293 A | | 8/2017 |
| DE | 69316738 T2 | | 6/1998 |
| DE | 102006036586 B4 | | 6/2011 |
| DE | 102017210182 A1 | * | 12/2018 |
| EP | 2082813 A1 | | 7/2009 |
| JP | 2015071177 A | * | 4/2015 |
| WO | 2009024163 A1 | | 2/2009 |

* cited by examiner

METHOD AND DEVICE FOR DETERMINING AN ACTUAL STATE OF SUPPORTING BARS OF A WORKPIECE SUPPORT, AND MACHINE TOOL HAVING A DEVICE OF THIS TYPE

CROSS REFERENCE TO RELATED APPLICATIONS

This application is a continuation of International Application No. PCT/EP2021/056805 (WO 2021/185899 A1), filed on Mar. 17, 2021, and claims benefit to German Patent Application No. DE 10 2020 107 256.2, filed on Mar. 17, 2020. The aforementioned applications are hereby incorporated by reference herein.

FIELD

The present disclosure relates to a method and to a device for determining an actual state of a supporting bar for supporting a plate-like workpiece, such as a metal sheet, on a machine tool for the cutting machining of workpieces, and also relates to a machine tool having a device of the disclosed type.

BACKGROUND

On laser flatbed machines, which are for the cutting machining of metal sheets by means of a laser, while they are being machined, the metal sheets rest on supporting projections of supporting bars, which are mounted parallel to one another on a pallet frame of a workpiece pallet with their longitudinal directions and spaced apart from one another in their transverse directions. As a consequence of the machining, supporting projections become worn and/or damaged, for example melted. As a result of this, the functioning of the supporting bars and of the workpiece support formed thereby can be impaired, this in turn possibly having an adverse effect on the machining process.

DE 10 2017 210 182 A1 relates to methods and devices for assessing the actual state and for the maintenance of supporting bars and of a workpiece support formed by supporting bars, in the case of which the actual state of a transverse extent of the supporting strips is detected and compared with an intended state. To detect the transverse extent, the supporting bars are moved through a light barrier with an optical beam extending in a longitudinal direction of the supporting strips or scanned by means of a line scan camera. In the event of a correspondingly pronounced deviation of the detected transverse extent of a supporting bar from the intended state being established, the supporting bar in question is subjected to maintenance or exchanged.

SUMMARY

In an embodiment, the present disclosure provides a method that determines an actual state of a supporting bar for supporting a plate-like workpiece, in particular a metal sheet, on a machine tool for the cutting machining of workpieces by a cutting beam. In an intended state of the supporting bar, the supporting bar is provided with multiple supporting projections, which are adjacent to one another in a longitudinal direction of the supporting bar, with a projection interspace being formed between mutually adjacent supporting projections, the supporting projections protrude from a basic body of the supporting bar to a supporting side of the supporting bar in the direction of a height of the supporting bar transversely with respect to the longitudinal direction of the supporting bar, with the supporting side of the supporting bar being designed for supporting the workpiece, and in a view of a longitudinal side, running in the longitudinal direction of the supporting bar, of the supporting bar, the supporting projections have a defined intended geometry with a projection height, with which the supporting projections extend over a defined height region, assigned to the supporting projections, of the supporting bar. The method includes: determining an actual geometry of the supporting projections on the supporting bar by a light section method, the light section method including: projecting a line of light extending in the longitudinal direction of the supporting bar from a light source onto the longitudinal side of the supporting bar; using the line of light to scan the longitudinal side of the supporting bar over at least part of the height region, assigned to the supporting projections, of the supporting bar in the direction of the height of the supporting bar, detecting the scanned extent of the longitudinal side of the supporting bar that was scanned using the line of light is detected by an optical detector to generate an image of the longitudinal side of the supporting bar, and determining the actual geometry of the supporting projections is determined on the basis of the generated image of the longitudinal side of the supporting bar by an evaluation device; and comparing the determined actual geometry of the supporting projections with the defined intended geometry of the supporting projections by a comparison device.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
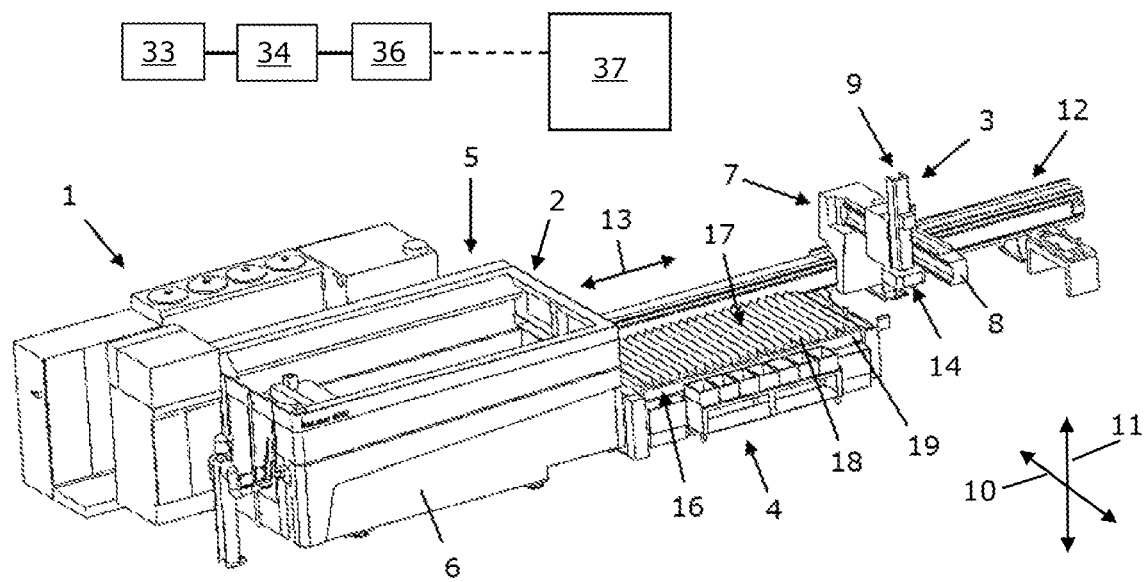
FIG. 1 shows a laser flatbed machine for the cutting machining of metal sheets by means of a laser.

The present disclosure relates to a method and to a device for determining an actual state of a supporting bar for supporting a plate-like workpiece (e.g., a metal sheet) on a machine tool for the cutting-machining of workpieces using a cutting beam, with, in an intended state of the supporting bar:

- the supporting bar being provided with multiple supporting projections, which are adjacent to one another in a longitudinal direction of the supporting bar, with a projection interspace being formed between mutually adjacent supporting projections;
- the supporting projections protruding from a basic body of the supporting bar to a supporting side of the supporting bar in the direction of a height of the supporting bar transversely with respect to the longitudinal direction of the supporting bar, with the supporting side of the supporting bar being designed for supporting the workpiece; and in a view of a longitudinal side, running in the longitudinal direction of the supporting bar, of the supporting bar, the supporting projections having a defined intended geometry with a projection height, with which the supporting projections extend over a defined height region, assigned to the supporting projections, of the supporting bar.

The present disclosure moreover relates to a method and a device for determining an actual state of a workpiece support of a machine tool for the cutting machining of a plate-like workpiece (e.g., a metal sheet) using a cutting beam, with the workpiece support, for the purpose of supporting the workpiece, comprising multiple supporting bars of the type stated above, the longitudinal directions of which run in the same direction and which are spaced apart from one another in a transverse direction.

The present disclosure also relates to a method for the cutting machining of a plate-like workpiece (e.g., a metal sheet) on a machine tool for the cutting machining of workpieces using a cutting beam, with the workpiece being supported on a workpiece support of the type stated above during the machining.

The present disclosure further relates to a machine tool having a device of the type stated above for determining an actual state of a workpiece support of the machine tool.

Aspects of the present disclosure provide methods and devices allowing further function-relevant features: (a) of a supporting bar; and (b) of a workpiece support (formed by supporting bars) to be monitored, and the findings obtained about the actual state: (a) of the supporting bar; and (b) of the workpiece support are utilized to ensure a functioning machining process.

In the present disclosure, the actual geometry, preferably the actual height, of support projections on supporting bars for supporting plate-like workpieces during cutting machining by means of a cutting beam, in particular for supporting metal sheets during cutting machining by means of a laser, is determined over the height of the supporting projections by a light section method and compared with a corresponding, previously defined intended geometry. The positions of the detected regions of a supporting bar are defined in a coordinate system of a numerical controller of the machine tool provided with the supporting bar in question or with the workpiece support in question. The determined actual geometry of the supporting projections is compared with the defined intended geometry in a numerical comparison device.

By determining the actual geometry of supporting projections over the projection height, and by comparing the determined actual geometry with the intended geometry, it is possible to establish the state of a supporting bar and/or of a workpiece support provided with the supporting bar, for example whether, and optionally to what extent, supporting projections of the supporting bars have melted or deformed with a reduction in the projection height. Consequences for subsequent machining processes are drawn from these findings in the event of the machining method executed according to the present disclosure and on the machine tool implemented according to the present disclosure. Specifically, in advance of a cutting machining operation for the workpiece to be machined and taking into account the actual geometry, determined over the projection height, of the supporting projections, a parts occupancy is defined, on the basis of which it is ensured that the subsequent machining process proceeds substantially without disruption and/or that, during the subsequent machining process, a machining result is obtained that meets the relevant quality demands. It is preferably the case that, on the basis of the previously determined actual geometry of the supporting projections and optionally with reference to the deviation of the actual geometry of the supporting projections from the intended geometry, a parts occupancy is defined on the workpiece to be machined, on the basis of which parts occupancy the parts cut free during the subsequent machining process are supported, without tilting, by the supporting projections of the supporting bars. Moreover, conceivable according to aspects of the present disclosure is a parts occupancy on the workpiece to be machined that is dependent on the actual geometry of the supporting projections, so that puncture sites of the cutting beam or a cutting line followed by the cutting beam on the workpiece do not lie above intact supporting projections, and as a result in particular the welding of scraps to supporting projections is avoided.

The actual geometry of the supporting projections over the projection height is determined according to aspects of the present disclosure by a light section method known in the art, within the course of which a line of light extending in the longitudinal direction of the supporting bar is projected from a light source onto the longitudinal side of a supporting bar, and the line of light is used to scan the longitudinal side of the supporting bar over at least part of the height region, assigned to the supporting projections, of the supporting bar in the direction of the height of the supporting bar. The scanned extent of the longitudinal side of the supporting bar that was scanned using the line of light is detected by means of an optical detector, in particular by means of a camera, to generate an image of the longitudinal side of the supporting bar, and the actual geometry of the supporting projections is determined on the basis of the generated image of the longitudinal side of the supporting bar by means of a numerical evaluation device in accordance with conventional methods.

It is preferably the case that, according to an aspect of the present disclosure, one or more cameras having coordinated filters are used to image the line of light, which moves on a supporting bar relative thereto in the direction of the height of the supporting bar, and a three-dimensional point cloud is generated from the images by means of the evaluation device according to an aspect of the present disclosure. The evaluation device can derive the state, in particular the height, of the supporting projections on the supporting bar from this point cloud.

As an alternative or in addition to the imaging triangulation according to the an aspect of the present disclosure, there is the option of detecting the actual geometry of supporting projections on supporting bars of a workpiece support over the projection height capacitively, inductively, on the basis of ultrasound, tactilely or using different imaging methods.

In this respect, it is possible either to use an individual sensor, which passes over the supporting bar in question in its longitudinal direction, or the supporting projections are detected by means of a sensor array, which extends over the entire length of the supporting bar in question. In the case of a sensor array, depending on the method it is necessary to ensure a sufficiently high, but not excessively high, density of individual sensors in order to allow as high as possible a resolution without disruptive superimposition.

For the tactile detection of supporting projections, sensors connected in an array, such as gearwheels or a tongue with needles, come into consideration. Measuring balls are also conceivable as tactile sensors.

In the context of alternative imaging methods, it is possible, for an image in which the entire workpiece support can be seen to be processed by a convolutional artificial neural network and thus for the state of supporting projections of a supporting bar provided as part of a workpiece support to be identified. In this respect, first of all simple shapes (lines in a certain orientation) and, later on, complex shapes composed of simple shapes (supporting projections as a combination of two lines) are identified in the image in multiple steps (layers of the network). By using as many supporting bars and degrees of damage as possible to teach the neural network, it is possible to achieve a very high identification rate.

It is also possible for supporting projections and thus the actual state of supporting bars to be detected by a camera on a cutting head that directs the cutting beam onto the workpiece to be machined. For this purpose, first of all the supporting bar is separated from the background in a recording. Then, the camera, with a fixed focal width and in a state focused on a supporting projection by means of autofocus, is moved in a direction of the height of the supporting bar. The height of the supporting projection can be calculated from the magnitude of the camera movement in a direction of the height of the supporting bar. A corresponding imaging system is offered by TRUMPF (Johann-Maus-Straße 2, D-71254 Ditzingen) under the name "DetectLine".

Moreover, by virtue of a camera on a laser beam path, a switched-on laser can be passed over supporting bars of a workpiece support in the longitudinal direction. The strength of the return reflection of the laser light is a measurement for the height of the supporting projections on the supporting bars over which the camera passes in a longitudinal direction. The imaging system likewise offered by TRUMPF under the name "PierceLine" is suitable for carrying out an imaging method of this type, for example.

Lastly, as a departure from the light section method according to an aspect of the present disclosure, stripe illumination of the supporting bars in question and a transillumination method come into consideration for detecting the actual geometry of supporting projections of a supporting bar over the projection height.

In the case of stripe illumination of a supporting bar, different stripe patterns are projected onto the supporting bar in question by a projector. One or more cameras, the relative position of which with respect to the projector and to the supporting bar are known, record the stripe patterns. A three-dimensional point cloud representing the supporting bar can be generated from the resulting images. In the process, it is possible to achieve sub-pixel accuracy, since the stripe patterns are known. The height of the supporting projections on the supporting bar can be easily garnered from the three-dimensional point cloud. In the event of a complex exposure environment, as is encountered frequently in the manufacture of sheet metal, for example, a projection in the non-visible infrared spectrum with coordinated filters in front of the camera(s) can be recommended.

A transillumination method is carried out on a supporting bar when a workpiece is mounted on the supporting bar. A light source is used to expose the workpiece from underneath at a longitudinal side of the supporting bar over the longitudinal extent of the supporting strip. At the oppositely situated longitudinal side of the supporting bar, the supporting bar is imaged on the bottom side of the workpiece by a camera. The supporting projections of the supporting bars appear as darkened portions here, and the projection interspaces appear bright. The actual state of the supporting projections can be calculated from the silhouette thereof.

In a preferred configuration of an aspect of the present disclosure, as line of light, a line of laser light is projected onto the longitudinal side of the supporting bar to be detected. Accordingly, a line laser is preferably provided as projector.

In a further configuration according to an aspect of the present disclosure, the longitudinal side of the supporting bar in the direction of its height is scanned with the supporting bar stationary and with the line of light being moved in the direction of the height of the supporting bar, and/or with the line of light stationary and with the supporting bar being moved toward the light source or away from the light source.

In a refinement of an aspect of the present disclosure, the method and the device for determining the actual geometry of supporting projections on a single supporting bar are also used to determine the actual geometry of supporting projections on multiple, preferably all, supporting bars of a workpiece support. In this case, positioning movements are generated in the transverse direction of the supporting bars, by means of which the supporting bars to be detected are advanced toward the light source of the scanning device and the associated optical detector successively into positions in which a scanning operation is carried out.

To reposition a workpiece support having multiple supporting bars to be detected with respect to a light source provided for all supporting bars and to an associated optical detector, in one refinement of an aspect of the present disclosure, an advancing device is provided, by means of which the workpiece support can be advanced in the transverse direction of the longitudinal sides of the supporting bars into positions in which the longitudinal sides of the supporting bars can be accessed one after the other by the light source and the optical detector of the device for carrying out a light section method.

The movement axes of which use is made when the longitudinal side of the supporting bars to be detected is being scanned and which are intended to generate the relative movement of the supporting bars and the line of light in the direction of the height of the supporting bar and optionally also the movement axes for repositioning supporting bars between individual scanning operations must have high positioning accuracy.

In a preferred configuration of the machine tool according to an aspect of the present disclosure, the movement, to be performed for the purpose of scanning the longitudinal side of one or more supporting bars, of the supporting bar(s) and/or the advancing movement of the supporting bar(s) is generated by means of a workpiece transferring device, which in all other respects serves to move the workpiece support provided with the supporting bar(s) into a work area of the machine tool for machining purposes.

To ensure defined exposure conditions, in a further, preferred configuration of an aspect of the present disclosure, the detection of the actual geometry of the supporting projections is carried out on the supporting bar(s) in question in the interior of an enclosure of the machine tool. In particular, the spatial delimitation of a work area of the machine tool according to an aspect of the present disclosure comes into consideration as enclosure.

According to FIG. 1, a machine tool in the form of a laser flatbed machine 1 for laser cutting metal sheets comprises a machining unit 2, a handling device 3 and a pallet changer 4.

A work space 5 of the machining unit 2 is provided with an enclosure 6. In the work space 5, the cutting machining of metal sheets is carried out by means of a conventional laser cutting head provided as machining device. In the figure, the laser cutting head is covered by the enclosure 6.

The handling device 3 has a movement unit 7 with a horizontal arm 8 and a service unit 9, which can travel along the arm 8 in the direction of a double-headed arrow 10. In addition to the possible movement in the direction of the double-headed arrow 10, the service unit 9 can be raised and lowered in a vertical direction (double-headed arrow 11).

Together with the service unit 9, the movement unit 7 can travel along a guide structure 12 of the handling device 3 in the direction of a double-headed arrow 13. A suction frame 14 is installed on the service unit 9.

The guide structure 12 of the handling device 3 runs along the pallet changer 4. The pallet changer 4 has a conventional design and, as usual, serves to charge the work area 5 of the machining unit 2 with metal sheets to be machined and to withdraw the machining products created in the course of the cutting machining of the metal sheets from the work space 5 of the machining unit 2. A metal sheet 15 is indicated in dashed lines in FIG. 2.

The metal sheet 15 to be machined and also the machining products are supported on a conventional workpiece pallet 16, which is provided with a workpiece support 17. The workpiece support 17 is usually formed by a plurality of supporting bars 18, which for their part are mounted on a pallet frame 19 of the workpiece pallet 16 and run mutually spaced apart and parallel to one another there. Together, the supporting bars 18 define a horizontal support plane of the workpiece support 17.

The handling device 3 is used as a loading and/or unloading device. A metal sheet 15 to be machined, as usual, is taken up from a stack of raw metal sheets using the suction frame 14 of the service unit 9 and deposited on an empty workpiece pallet 16 at the pallet changer 4. Then, the workpiece pallet 16 loaded with the metal sheet 15 to be machined is pushed into the work space 5 of the machining unit 2 by means of a workpiece transferring device, in the form of a chain drive, of the pallet changer 4 with a horizontal transferring movement through an opening, which is covered in FIG. 1, in the enclosure 6. The cutting machining of the metal sheet follows in the work space 5 of the machining unit 2, in the course of which finished parts, as machining products, and a residual cut-out sheet are produced from the metal sheet 15.

Together with the workpiece pallet 16, the machining products of the cutting machining of the metal sheet are drawn out of the work space 5 of the machining unit 2 on the pallet changer 4 through the opening in the enclosure 6 using the chain drive of the pallet changer 4. The workpiece pallet 16 arranged on the pallet changer 4 is then unloaded by means of the handling device 3.

FIG. 1 shows the machine arrangement 1 at a point in time at which the workpiece pallet 16 arranged on the pallet changer 4 is fully unloaded.

Figure 2:
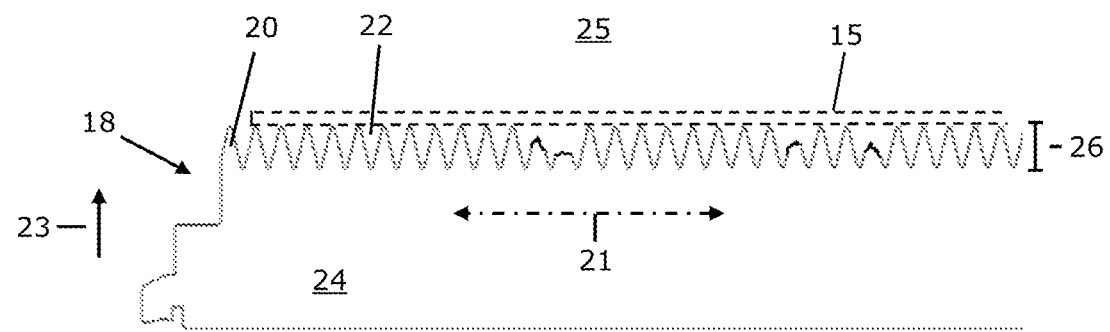
FIG. 2 shows a partial illustration of one of the supporting bars of a workpiece support of the laser flatbed machine according to FIG. 1.

One of the structurally identical supporting bars 18 of the workpiece support 17 is illustrated in FIG. 2.

The supporting bar 18 is provided with multiple supporting projections 20, which are adjacent to one another in a longitudinal direction 21 of the supporting bar 18. A respective projection interspace 22 is formed between mutually adjacent supporting projections 20. The supporting projections 20 protrude from a basic body 24 of the supporting bar 18 transversely with respect to the longitudinal direction 21 of the supporting bar 18 toward a supporting side 25 of the supporting bar 18 in the direction of a height (arrow 23) of the supporting bar 18. On the supporting side 25, the supporting projections 20 are provided with tips for supporting a metal sheet 15 during the cutting machining. To form the workpiece support 17, multiple supporting bars 18 are mounted on the pallet frame 19 in such a way that their longitudinal directions 21 run in the same direction and they are spaced apart from one another transversely thereto.

In an intended state of the supporting bars 18, in the view shown in FIG. 2 of a longitudinal side, running in the longitudinal direction 21 of the supporting bar 18, of the supporting bar 18, the supporting projections 20 have a defined intended geometry with a projection height 26, with which the supporting projections 20 extend over a defined height region, assigned to the supporting projections 20, of the supporting bar 18.

During the cutting machining of metal sheets, the supporting bars 18 of the workpiece support 17 are adversely affected. According to FIG. 2, during previous machining processes multiple ones of the supporting projections 20 were melted over part of the original projection height 26 by the laser cutting beam used for the cutting machining of metal sheets and directed onto a metal sheet 15 by the laser cutting head.

Owing to the damage to individual supporting projections 20 on one or more supporting bars 18, the functioning of the workpiece support 17 can be impaired. In particular, there is the risk that parts cut free during the cutting machining of metal sheets tilt on the workpiece support 17 as a result of the non-uniform height of the supporting projections 20 and that consequently, disruptions occur in the course of mechanically unloading the workpiece support 17.

In order to prevent disruption to the process sequence on the laser flatbed machine 1, the actual state of the workpiece support 17 is determined at regular intervals with the workpiece support 17 unloaded and is compared with an intended state of the workpiece support 17.

Figure 3:
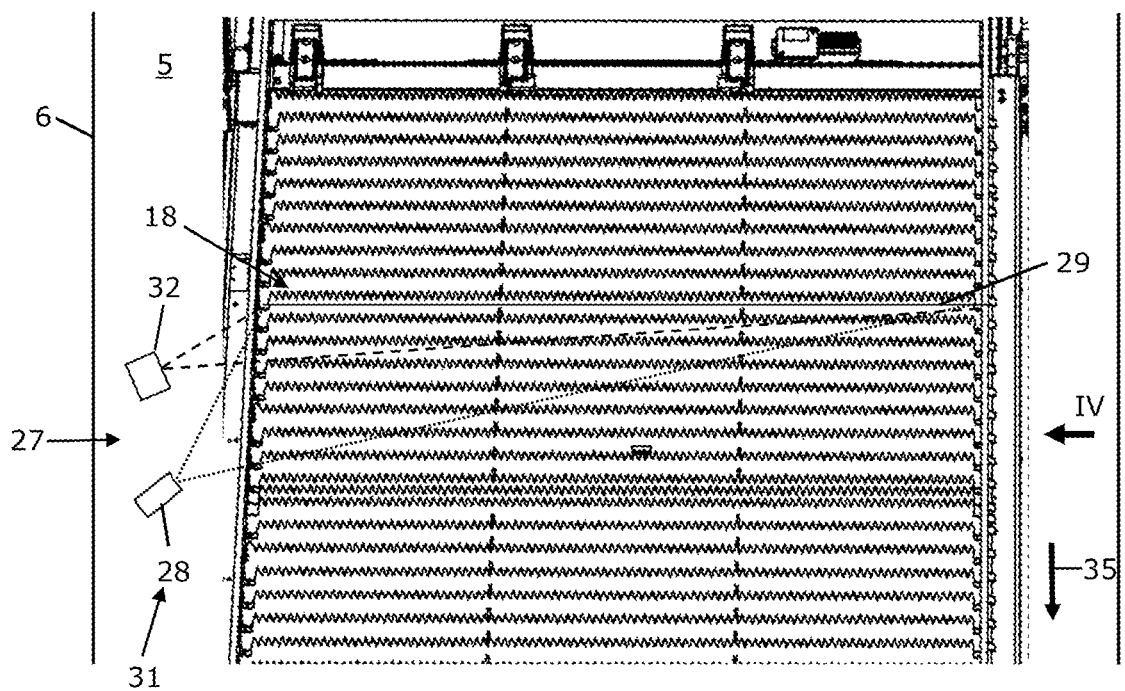
FIG. 3 shows the detection of the actual state of the workpiece support of the laser flatbed machine according to FIG. 1.
Figure 4:
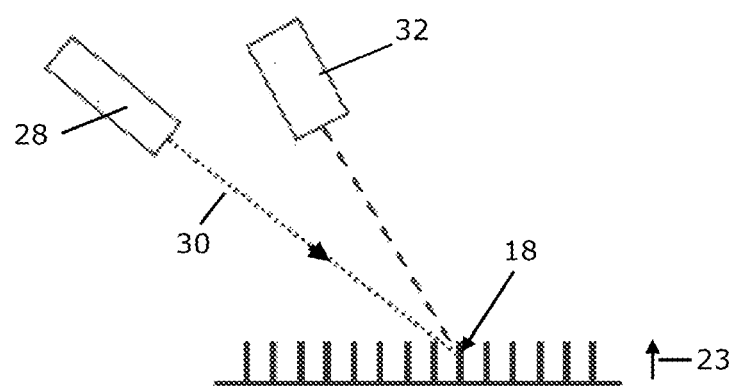
FIG. 4 shows a highly schematic illustration of the detection operation according to FIG. 3 in a view in the direction of the arrow IV in FIG. 3.

The determination of the actual state of the workpiece support 17 is depicted in FIGS. 3 and 4.

To determine the actual state of the workpiece support 17, the actual geometry of the supporting projections 20 is determined on all supporting bars 18 of the workpiece support 17 one after the other by a light section method. In the interests of optimum light conditions when carrying out the light section method, the actual geometry of the supporting projections 20 is determined on the supporting bars 18 in the darkened interior of the work space 5, surrounded by the enclosure 6, of the laser flatbed machine 1 (FIG. 3).

A device 27 for carrying out the light section method has, as light source, a line laser 28 which projects, as line of light, a line of laser light 29 extending in the longitudinal direction 21 of the supporting bars 18 onto the longitudinal side, facing the line laser, of the supporting bar 18 to be detected. The line of laser light 29 is projected onto the longitudinal side of the supporting bar 18 at an angle which is not a right angle, in a projection direction 30 indicated in dashed lines in FIG. 4.

The line laser 28 is part of a scanning device 31, by means of which the longitudinal side of the supporting bar 18 is scanned with the line of laser light 29 over at least part of the height region, that is assigned to the supporting projections 20, of the supporting bar 18 in the direction 23 of the height of the supporting bar 18. To generate the movement to be performed by the line of laser light 29 relative to the supporting bar 18 in the direction 23, the scanning device 31 utilizes the workpiece transferring device of the pallet changer 4, by means of which the supporting bar 18 exposed to the line of laser light 29 is moved in the direction of the line laser 28 counter to the projection direction 30.

A camera 32, provided as optical detector of the device 27 for carrying out the light section method, detects the entire extent of the longitudinal side of the supporting bar 18 that was scanned by the line of laser light 29 to generate an image of the longitudinal side of the supporting bar 18. A numerical evaluation device 33 of the device 27 for carrying out the light section method uses conventional triangulation to determine the actual geometry of the supporting projections 20 on the supporting bar 18, specifically the actual height of the supporting projections, on the basis of the image generated by the camera 32. The numerical evaluation device 33 of the device 27 for carrying out the light section method is illustrated highly schematically in FIG. 1.

The actual geometry, determined by means of the device 27 for carrying out the light section method, of the supporting projections 20 is compared, in a numerical comparison device 34, with an intended geometry, stored therein, of the supporting projections 20. In the process, an identification is made on the supporting bars 18 illustrated in FIG. 2 that individual supporting projections 20 have melted.

In the way mentioned above, the procedure continues with all supporting bars 18 of the workpiece support 17 one after another. After the determination of the actual state of a supporting bar 18 has finished, the workpiece support 17 is repositioned by means of the workpiece transferring device of the pallet changer 4 in an advancing direction, depicted by an arrow 35 in FIG. 3, with the result that the one detected supporting bar 18 passes, counter to the advancing direction 35, into the detection position according to FIG. 3 and the actual state of the further supporting bar 18 or the actual height of the supporting projections 20 provided on this supporting bar 18 can be determined by scanning the supporting bar 18 in the direction 23 of its height. In addition or as an alternative to a repositioning movement of the workpiece support 17 in the advancing direction 35, the line laser 28 and the camera 32 can be adjusted counter to the advancing direction 35 of adjacent supporting bars 18 to detect the one detected supporting bar 18.

The actual state of the workpiece support 17 is determined from the actual state of the individual supporting bars 18 by a numerical evaluation unit 36. Specifically, in the process, the locations at which the workpiece support 17 has damaged supporting projections 20 is ascertained.

This information is taken into account in the programming of a numerical machine controller 37 of the laser flatbed machine 1 for subsequent machining processes. In the present exemplary case, for a metal sheet 15 subsequently to be machined, a parts occupancy is defined, on the basis of which the parts cut out of the metal sheet 15 are supported on the workpiece support without tilting regardless of the damaged supporting projections 20. Moreover, a corresponding parts occupancy of the metal sheet 15 subsequently to be machined ensures that puncture points of the laser cutting beam directed onto the metal sheet 15 by the laser cutting head of the machining unit 2 do not lie above an intact supporting projection 20 of the workpiece support 17 and that the cutting path followed by the laser cutting beam on the metal sheet 15 runs over projection interspaces 22 and/or over melted supporting projections 20.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for determining an actual state of a supporting bar for supporting a plate-like workpiece on a machine tool for a cutting machining of workpieces by a cutting beam, with, in an intended state of the supporting bar:

the supporting bar being provided with multiple supporting projections, which are adjacent to one another in a longitudinal direction of the supporting bar, with a projection interspace being formed between mutually adjacent supporting projections, the supporting projections protruding from a basic body of the supporting bar to a supporting side of the supporting bar in the direction of a height of the supporting bar transversely with respect to the longitudinal direction of the supporting bar, with the supporting side of the supporting bar being designed for supporting the workpiece, and in a view of a longitudinal side, running in the longitudinal direction of the supporting bar, of the supporting bar, the supporting projections having a defined intended geometry with a projection height, with which the supporting projections extend over a defined height region, assigned to the supporting projections, of the supporting bar, the method comprising:

determining an actual geometry of the supporting projections on the supporting bar by a light section method, the light section method comprising:

projecting a line of light extending in the longitudinal direction of the supporting bar from a light source onto the longitudinal side of the supporting bar;

using the line of light to scan the longitudinal side of the supporting bar over at least part of the height region, assigned to the supporting projections, of the supporting bar in the direction of the height of the supporting bar, detecting the scanned extent of the longitudinal side of the supporting bar that was scanned using the line of light by an optical detector to generate an image of the longitudinal side of the supporting bar, and determining the actual geometry of the supporting projections based on the generated image of the longitudinal side of the supporting bar by an evaluation device; and comparing the determined actual geometry of the supporting projections with the defined intended geometry of the supporting projections by a comparison device.

2. The method as claimed in claim 1, wherein, as the line of light, a line of laser light is projected onto the longitudinal side of the supporting bar.

3. The method as claimed in claim 1, wherein the longitudinal side of the supporting bar is scanned using the line of light,
wherein the line of light is moved parallel to itself relative to the supporting bar in the direction of the height of the supporting bar, or
wherein the line of light is projected from the light source onto the longitudinal side of the supporting bar at an angle which is not a right angle and is formed between a projection direction and the direction of the height of the supporting bar, and the supporting bar is moved toward the light source counter to the projection direction or away from the light source in the projection direction.

4. The method as claimed in claim 1, wherein the method is carried out in the interior of an enclosure of the machine tool.

5. The method of claim 1, wherein the plate-like workpiece is a metal sheet.

6. The method as claimed in claim 1, wherein the method is carried out in the interior of an enclosure provided with a machining device for the cutting machining of workpieces.

7. A method for determining an actual state of a workpiece support of a machine tool for the cutting machining of a plate-like workpiece by a cutting beam,
with the workpiece support, for supporting the workpiece, comprising multiple supporting bars, the longitudinal directions of which run in the same direction and which are spaced apart from one another in a transverse direction, and
with, in an intended state of the supporting bars,
the supporting bars each being provided with multiple supporting projections, which are adjacent to one another in a longitudinal direction of the supporting bars, with a projection interspace being formed between mutually adjacent supporting projections,
the supporting projections each protruding from a basic body of the supporting bar to a supporting side of the supporting bar in the direction of a height of the supporting bar transversely with respect to the longitudinal direction of the supporting bar, with the supporting side of the supporting bar being designed for supporting the workpiece, and,
in a view of a longitudinal side, running in the longitudinal direction of the supporting bar, of the supporting bar, the supporting projections each having a defined intended geometry with a projection height, with which the supporting projections extend over a defined height region, assigned to the supporting projections, of the supporting bar,
wherein the actual state of at least one of the supporting bars of the workpiece support is determined by the method as claimed in claim 1.

8. The method as claimed in claim 7, wherein the actual state of each of the supporting bars of the workpiece support is determined,
wherein the actual geometry of each of the supporting projections is determined on the supporting bars by the light section method,
wherein the line of light extending in the longitudinal direction of the supporting bar is projected from the light source onto the longitudinal side of each of the supporting bars, and the line of light is used to scan the longitudinal side of the supporting bar over at least part of the height region, assigned to the supporting projections, of the supporting bar in the direction of the height of the supporting bar,
wherein, for each of the supporting bars, the scanned extent of the longitudinal side of the supporting bar that was scanned using the line of light is detected by the optical detector to generate an image of the longitudinal side of the supporting bar, and
wherein, for each of the supporting bars, the actual geometry of the supporting projections is determined on the basis of the generated image of the longitudinal side of the supporting bar by the evaluation device and
wherein, for each of the supporting bars, the determined actual geometry of the supporting projections is compared with the defined intended geometry of the supporting projections by the comparison device.

9. The method of claim 7, wherein the plate-like workpiece is a metal sheet.

10. A method for a cutting machining of a plate-like workpiece on a machine tool for the cutting machining of workpieces by a cutting beam,
with the workpiece being supported on a workpiece support of the machine tool during the machining, the workpiece support, for the purpose of supporting the workpiece, comprising multiple supporting bars, the longitudinal directions of which run in the same direction and which are spaced apart from one another in a transverse direction,
with, in an intended state of the supporting bars,
the supporting bars each being provided with multiple supporting projections, which are adjacent to one another in a longitudinal direction of the supporting bars, with a projection interspace being formed between mutually adjacent supporting projections,
the supporting projections each protruding from a basic body of the supporting bar to a supporting side of the supporting bar in the direction of a height of the supporting bar transversely with respect to the longitudinal direction of the supporting bar, with the supporting side of the supporting bar being designed for supporting the workpiece, and,
in a view of a longitudinal side, running in the longitudinal direction of the supporting bar, of the supporting bar, the supporting projections each having a defined intended geometry with a projection height, with which the supporting projections extend over a defined height region, assigned to the supporting projections, of the supporting bar,
the method comprising:
determining the actual state of the workpiece support by the method as claimed in claim 7,
wherein a parts occupancy with workpiece parts to be created during the cutting machining of the workpiece is defined for the workpiece depending on the detected actual state of the workpiece support, and
wherein the workpiece and the cutting beam directed onto the workpiece are moved relative to one another along a cutting path during the cutting machining of the workpiece, the course of the cutting path corresponding to the defined parts occupancy of the workpiece.

11. The method of claim 10, wherein the plate-like workpiece is a metal sheet.

12. A device for determining an actual state of a supporting bar for supporting a plate-like workpiece on a machine tool for the cutting machining of workpieces by a cutting beam, with, in an intended state of the supporting bar, the supporting bar being provided with multiple supporting projections, which are adjacent to one another in a longitudinal direction of the supporting bar, with a projection interspace being formed between mutually adjacent supporting projections, the supporting projections protruding from a basic body of the supporting bar to a supporting side of the supporting bar in the direction of a height of the supporting bar transversely with respect to the longitudinal direction of the supporting bar, with the supporting side of the supporting bar being designed for supporting the workpiece, and, in a view of a longitudinal side, running in the longitudinal direction of the supporting bar, of the supporting bar, the supporting projections having a defined intended geometry with a projection height, with which the supporting projections extend over a defined height region, assigned to the supporting projections, of the supporting bar, wherein the device is a device configured to determine an actual geometry of the supporting projections of the supporting bar, in that the device comprises a device for carrying out a light section method and a comparison device, wherein the device for carrying out the light section method comprises:

a scanning device, which comprises a light source, from which a line of light extending in the longitudinal direction of the supporting bar is projectable onto the longitudinal side of the supporting bar, and the scanning device is configured to be used to scan the longitudinal side of the supporting bar with the line of light over at least part of the height region, assigned to the supporting projections, of the supporting bar in the direction of the height of the supporting bar, an optical detector, which is configured to be used to detect the scanned extent of the longitudinal side of the supporting bar that was scanned using the line of light to generate an image of the longitudinal side of the supporting bar, and an evaluation device, which is configured to be used to determine the actual geometry of the supporting projections based on the generated image of the longitudinal side of the supporting bar, and wherein the comparison device is configured to compare the determined actual geometry of the supporting projections with the defined intended geometry of the supporting projections.

13. A device for determining an actual state of a workpiece support of a machine tool for the cutting machining of a plate-like workpiece by a cutting beam, with the workpiece support, for the purpose of supporting the workpiece, comprising multiple supporting bars, the longitudinal directions of which run in the same direction and which are spaced apart from one another in a transverse direction, and with, in an intended state of the supporting bars, the supporting bars each being provided with multiple supporting projections, which are adjacent to one another in a longitudinal direction of the supporting bars, with a projection interspace being formed between mutually adjacent supporting projections, the supporting projections each protruding from a basic body of the supporting bar to a supporting side of the supporting bar in the direction of a height of the supporting bar transversely with respect to the longitudinal direction of the supporting bar, with the supporting side of the supporting bar being designed for supporting the workpiece, and in a view of a longitudinal side, running in the longitudinal direction of the supporting bar, of the supporting bar, the supporting projections each having a defined intended geometry with a projection height, with which the supporting projections extend over a defined height region, assigned to the supporting projections, of the supporting bar the device, for at least one of the supporting bars, comprising the device as claimed in claim 12 for determining an actual state of the at least one of the supporting bars,.

14. The device as claimed in claim 13, wherein, for each the supporting bars of the workpiece support, the device for determining the actual state of the at least one of the supporting bars is provided as common device for determining an actual state of each of the supporting bars, wherein the device for carrying out the light section method comprises:

a scanning device, which comprises a light source, from which a line of light extending in the longitudinal direction of the supporting bar is configured to be projected onto the longitudinal side of each of the supporting bars, and the scanning device can be used to scan the longitudinal side of each of the supporting bars with the line of light over at least part of the height region, assigned to the supporting projections, of the supporting bar in the direction of the height of the supporting bar, an optical detector, which is configured be used, for each of the supporting bars, to detect the scanned extent of the longitudinal side of the supporting bar that was scanned using the line of light to generate an image of the longitudinal side of the supporting bar, and also an evaluation device, which is configured to be used, for each of the supporting bars, to determine the actual geometry of the supporting projections on the basis of the generated image of the longitudinal side of the supporting bar and wherein the comparison device is configured to be used, for each of the supporting bars, to compare the determined actual geometry of the supporting projections with the defined intended geometry of the supporting projections.

15. The device as claimed in claim 14, wherein an advancing device is provided, by which the workpiece support is configured to be advanced in the transverse direction of the longitudinal sides of the supporting bars into positions in which the longitudinal sides of the supporting bars are configured to be accessed one after the other by the device for carrying out the light section method.

16. A machine tool for the cutting machining of a plate-like workpiece by a cutting beam, the machine tool comprising:

a workpiece support, which, for supporting the workpiece, comprises multiple supporting bars, the longitudinal directions of which run in the same direction and which are spaced apart from one another in a transverse direction, with, in an intended state of the supporting bars, the supporting bars each being provided with multiple supporting projections, which are adjacent to one another in a longitudinal direction of the supporting bars, with a projection interspace being formed between mutually adjacent supporting projections, the supporting projections each protruding from a basic body of the supporting bar to a supporting side of the supporting bar in the direction of a height of the supporting bar transversely with respect to the longitudinal direction of the supporting bar, with the supporting side of the supporting bar being designed for supporting the workpiece, and, in a view of a longitudinal side, running in the longitudinal direction of the supporting bar, of the supporting bar, the supporting projections each having a defined intended geometry with a projection height, with which the supporting projections extend over a defined height region, assigned to the supporting projections, of the supporting bar;

a machining device for the cutting machining of workpieces, which is configured to generate a cutting beam by which the workpiece is configured to be machined by cutting; and the device as claim in claim 9 for determining the actual state of the workpiece support.

17. The machine tool as claimed in claim 16, comprising:

a work space comprising an enclosure, in which work space the machining device for the cutting machining of workpieces is configured to be arranged during the cutting machining of workpieces, and wherein the workpiece support is configured to be arranged in the interior of the enclosure for determining an actual state of the workpiece support.

18. The machine tool as claimed in claim 16,, wherein, for the cutting machining of workpieces, the machining device has a work area in which a workpiece supported by the workpiece support can be accessed by the cutting beam of the machining device for the cutting machining of workpieces, wherein a workpiece transferring device is provided, by which the workpiece support can be advanced into the work area of the machining device for the purpose of moving the workpiece supported by the workpiece support, and wherein the workpiece transferring device is provided as advancing device of the device for determining an actual state of the workpiece support.

* * * * *